Sept. 22, 1942. T. A. BOWERS 2,296,463
METHOD OF MAKING OIL RINGS
Filed Nov. 25, 1939 2 Sheets-Sheet 1
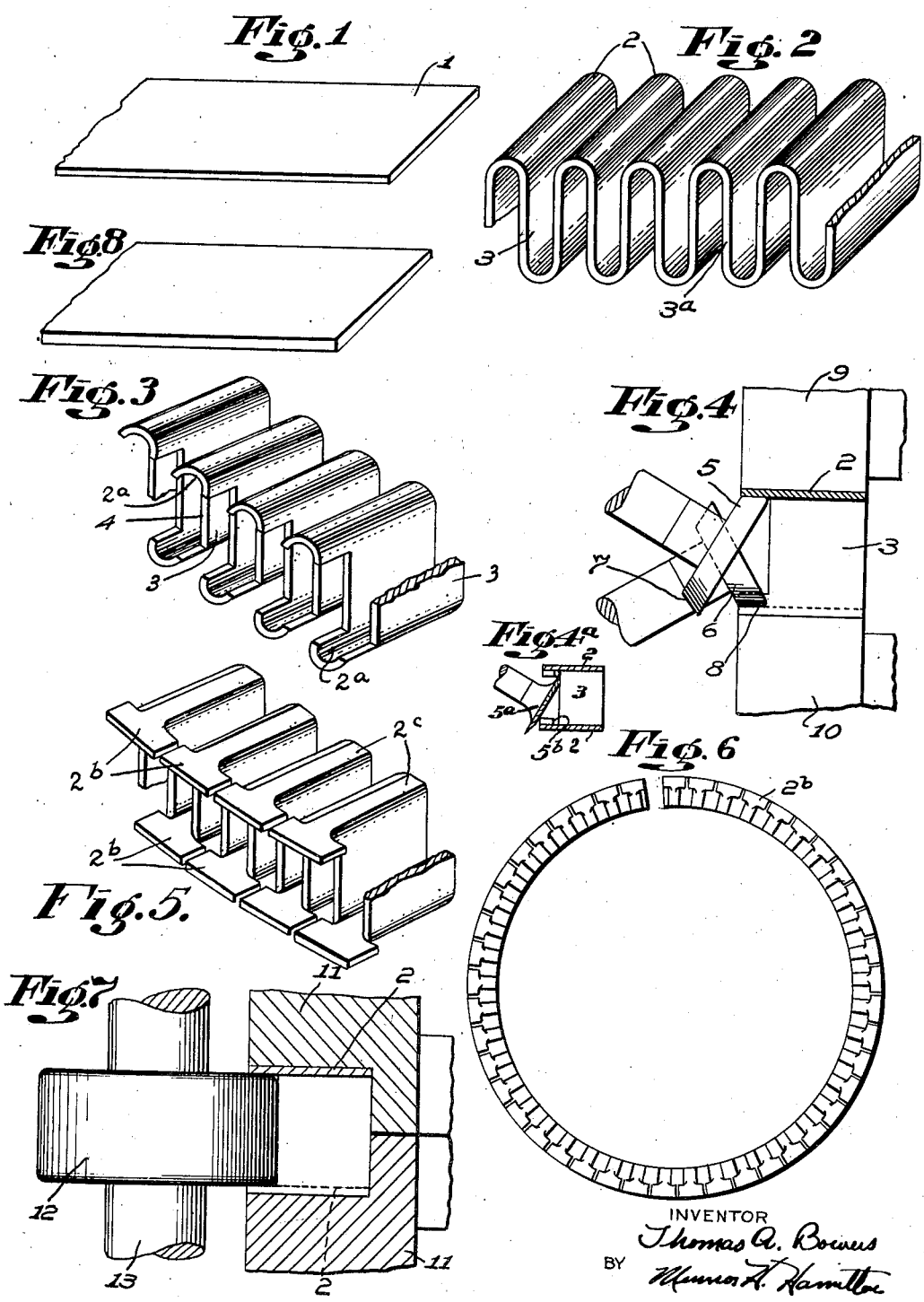

Sept. 22, 1942.  T. A. BOWERS  2,296,463
METHOD OF MAKING OIL RINGS
Filed Nov. 25, 1939  2 Sheets-Sheet 2
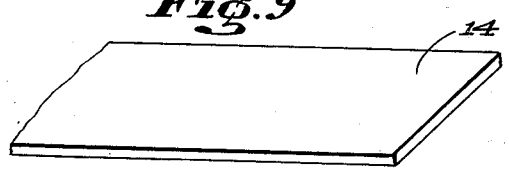
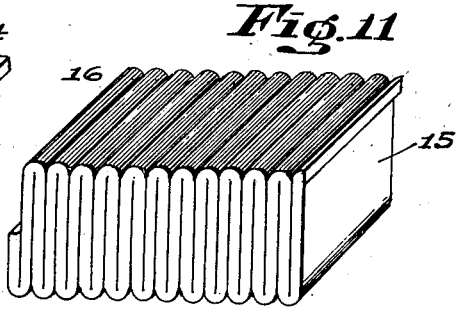
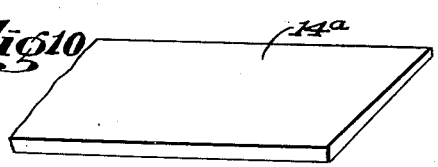
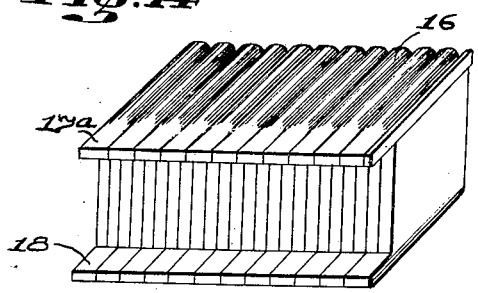
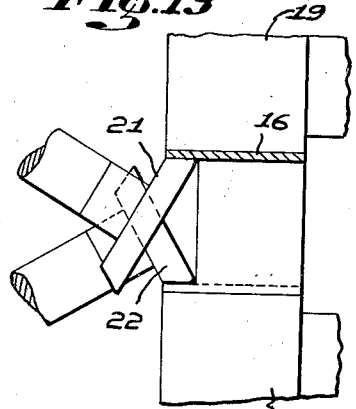
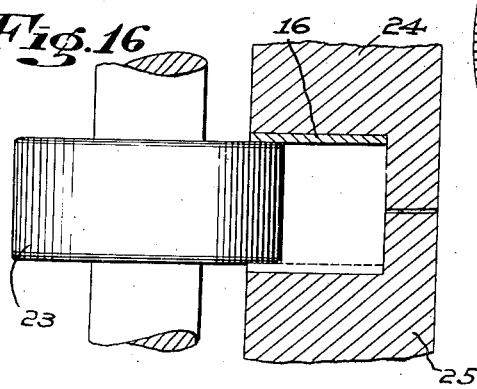
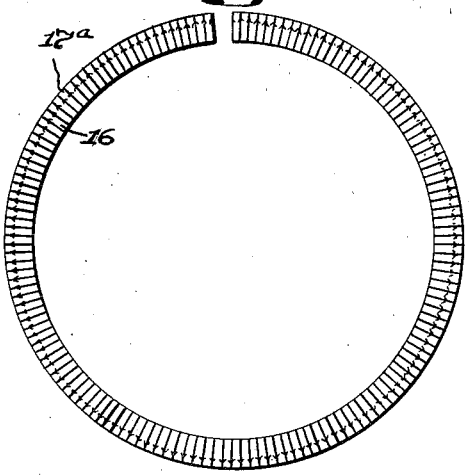
INVENTOR
Thomas A. Bowers
BY
ATTORNEY Patented Sept. 22, 1942

2,296,463

UNITED STATES PATENT OFFICE 2,296,463

METHOD OF MAKING OIL RINGS

Thomas A. Bowers, Boston, Mass., assignor to Power Research Corporation, Boston, Mass., a corporation of Massachusetts Application November 25, 1939, Serial No. 306,098

3 Claims. (Cl. 29—156.6)

This invention relates to piston rings and more especially to a method of fabricating oil control rings from sheet material.

It is a principal object of the present invention to improve fabricated oil rings and their methods of manufacture and to devise novel steps in the making of the rings, with a view to providing oil scraping edges in the peripheries of such rings and to cheapening their cost of manufacture, reducing the time and equipment employed, and effecting novel strengthening characteristics in the fabricated structure.

These and other objects of the invention will be more readily understood from the following description when read in connection with the accompanying drawings, and the novel features will be more particularly pointed out in the appended claims.

In the accompanying drawings:

Fig. 1 is a perspective view illustrating a strip of material employed in making the fabricated ring of the invention.

Fig. 2 is a perspective view illustrating a folding step in the method of the invention.

Fig. 3 is another perspective view illustrating a further step of recessing the periphery of the ring shown in Fig. 2.

Fig. 4 is a diagrammatic view illustrating still another rolling step in the method of ring construction.

Fig. 4a is a view similar to Fig. 4 illustrating a modified cutting step.

Fig. 5 is another perspective view fragmentarily illustrating the outer periphery of a ring formed with flat scraping edges as effected by the rolling step indicated in Fig. 4.

Fig. 6 is a plan view further illustrating the ring in a finished state.

Fig. 7 is a modification of forming step which may be employed in effecting flat scraping edges from a ring such as that indicated in Fig. 3.

Fig. 8 is a perspective view fragmentarily indicating a modified type of piston ring material which may be utilized in the process indicated in Figs. 1–7 inclusive.

Figs. 9 and 10 fragmentarily illustrate ring materials similar to those shown in Figs. 1 and 8 and suitable for use in carrying out another modification of method of piston ring manufacture.

Fig. 11 illustrates a step of folding the material into a compacted ring body in the modified method referred to.

Fig. 12 illustrates a further step of cutting away the periphery of the ring body to form oil scraping edges.

Fig. 13 illustrates a final step of swaging and flattening out the compacted oil scraping edges.

Fig. 14 is a fragmentary perspective view of the ring material formed by the method indicated in Figs. 9–13 inclusive.

Fig. 15 is a plan view further illustrating the finished ring; and

Fig. 16 is a diagrammatic view of a forming roll illustrating a modified step of swaging the material indicated in Fig. 12.

In the construction shown, a strip of piston ring material 1 is employed which may be of any suitable composition as for example a resilient sheet metal. The metal is folded upon itself as illustrated in Fig. 2 by some suitable means such as complementary dies to present crowns 2 and webs 3. Thereafter a length of this folded material is formed into an open annular body to comprise a piston ring in which the edges 3a of the sheet material comprise the peripheries of the ring.

Ring structures fabricated from sheet metal as described are of a desirable flexibility, due to the fact that they are circumferentially contractible and extensible which allows the ring to efficiently conform to cylinder walls, particularly those which are worn. In addition, such ring structures are of an open character which provides increased passageways for oil to pass therethrough. However it has been found further desirable to effect in such structures relieved edges for scraping oil, of the character conventionally effected in cast iron rings by turning a groove in the periphery of the cast iron rings.

In accordance with the invention, the ring of Fig. 2 is provided with scraping edges in the manner indicated in Figs. 3 and 4 in which it will be observed that the edges 3a comprising the outer periphery of the ring are first recessed to effect cut-in edges 4 and relieved crown portions 2a. This operation may be effected by any suitable cutting operation, as for instance by turning. It will be noted that the relieved crown portions 2a are of an arcuate formation and a feature of the novel method of the invention is to flatten or bend these arcuate portions into substantially flat segments 2b so that they occur in a continuous manner to comprise oil scraping edges of the character desired. This operation is effected by special rolls 5 and 6, as illustrated in Fig. 4, which preferably are formed with beveled faces 7 and 8 adapted to engage against the relieved crown portions 2a and gradually flatten or bend them against some suitable support such as the bases 9 and 10. The result of this operation is to stretch the metal and to form flat segments 2b to comprise top and bottom rows of scraping edges. In addition the crowns 2 become flattened out along their tops and bottoms as indicated by numeral 2c and at the points at which the segments join with the crowns no cuts are employed with the metal being gradually stretched to effect a strong construction between the segments and the rest of the ring body. The flattened portions of the crowns 2c are desirable to effect improved seating of the ring in its ring groove. It should be noted that when an oil ring moves downwardly of its cylinder wall, thereby scraping up relatively large amounts of oil, it must present a substantially continuous annular surface which may seal against the top side of its piston groove, and prevent oil from escaping back on the parts of the cylinder periphery which have just been scraped. The flat segments 2b, when contiguously arranged as described, form substantially continuous annular surfaces at opposite sides of the ring. These surfaces allow the ring to seal against a side of its piston groove. This effects improved seating of the ring since only a part of its radial width is utilized to furnish a satisfactory seal for the purpose referred to.

In place of the step of applying to the ring a roll such as has been illustrated in Fig. 4, it may be desired to use a modified type of rolling step such as has been diagrammatically indicated in Fig. 7, in which the crowns 2 are adjustably secured in blocks 11 and a forming roller 12 supported on a shaft 13 is allowed to move through the turned periphery of the folded material of Fig. 3. It is intended that several of these forming rollers 12 may be employed one after another with each succeeding roll increasing slightly in width so as to gradually bend the relieved crown portions 2a into a substantially flat condition such as has been illustrated in Figs. 5 and 6. During this operation, the relieved crown portions 2 become separated for a short distance from the remainder of the ring along lines of separation which extend axially of the ring.

If desired, the ring may be held in the blocks 11 and rotated around the roll 12 and in either instance the sides of the roll may be partly beveled or rounded off to effect a more gradual stretch of the metal at the points at which the recessed edges terminate. This rounded construction has been shown with respect to both the rolls shown. If desired, a cutting or slitting operation may be effected with a cutting tool 5a, as has been illustrated in Fig. 4a, in which it will be noted that the arcuate portions may be slightly cut along lines of cutting which extend axially of the ring to provide cuts 5b and to facilitate rapid flattening down. It may further be desired to use specially formed rolls for starting the arcuate portions into a flattened down position.

It should be observed that the scraping edges being made up of a plurality of segments are uniformly flexible all around their length and therefore adhere to the cylinder wall more efficiently. Also the edges are interrupted which allows oil scraped by the edges to pass through the points of interruption and thence through the ring to oil holes in the piston. The step of folding illustrated is of the most simple form and is quickly and easily effected. Similarly the recessing and flattening operations are simple, efficient operations which offer no objectionable difficulties. The combination of the three steps provides a simple process of ring manufacture. If desired, the ring in its form illustrated in Fig. 3 may be employed with some success as an oil scraping member without the flattening operation described.

In Figs. 9 to 15 there has been illustrated a modified method of fabricating an oil control ring from sheet metal which consists in forming oil scraping edges in a ring of compacted sheet metal. A strip of metal 14 is reversely folded upon itself and closed up as indicated in Fig. 11 to comprise a substantially compacted body having web portions 15 and crown-forming portions 16. Some suitable cutting operation as turning is again employed as illustrated in Fig. 12 to remove portions of the webs 15 along one side thereof. This leaves relieved crowns 17 and 18. It will be noted that these crowns are in contact with one another which prevents their being bent out into flat segments, and to form the crowns 17 and 18 into substantially square edges, a modified step is employed as has been illustrated diagrammatically in Fig. 13, in which the crowns 16 are supported in blocks 19 and 20, and rolls 21 and 22 are applied at the insides of the crowns to flow the metal therein and secure the segments illustrated in Fig. 14.

As noted above the change effected by the rolls in Fig. 13 is not a bending operation but consists in a swaging operation in which the metal comprising the crowns 17 and 18 is flowed into a substantially square form such as is shown in Fig. 14. This modified method makes possible formation of edges on compacted material independently of the bending effected with open fabricated structures and these compacted structures may be desirable for some purposes. The compacted type of fabricated ring may resist formation of carbon in a desirable manner since the contacting webs of metal are constantly flexing upon one another.

In Fig. 16 I have illustrated a modified forming step which may be employed in place of the step illustrated in Fig. 15. This essentially consists in the use of a forming roll 23 of the same general character as the forming roll 12 shown in Fig. 7. Also provided are blocks 24 and 25 which may be adjustably secured together at the crowns 16 of the ring. As previously described, a plurality of rolls such as 23 of succeedingly increasing size may be employed and if desired the holding blocks 24 and 25 may be supported in some suitable manner as to be rotated around the forming roll instead of having the forming roll rotated around the ring. It is pointed out that the action of these rolls is to flow metal rather than to bend it.

If desired, a sheet material 14a of a wedge-shaped cross section such as that shown in Fig. 10 may be employed, which may be desired to effect novel strengthening at various points in the ring structure, as by its use one side of a ring may be made of heavier stock than an opposite side.

The method described affords a quick, cheap and efficient way of forming scraping edges in a fabricated ring of closely compacted sheet material and essentially comprises swaging adjacent recessed edges as compared with bending separated relieved crown portions of the modification in Figs. 1–5 inclusive.

If desired, certain other finishing operations may be carried out although they are not mandatory. For instance, the ring may be hardened by some means as heating and quenching in oil or certain grinding and polishing operations may be effected.

It will be seen that there is presented a simple, cheap, fast method of making fabricated rings and forming oil scraping edges in their peripheries, and the procedures disclosed are adapted to handling various types of material and to effecting large scale production.

While I have shown a preferred embodiment of my invention, it should be understood that various modifications in the tools and their application may be resorted to and other types of materials such as materials turned at right angles from those shown may be treated, and other changes included in keeping with the spirit of the invention.

Having thus described my invention, I claim:

1. That improvement in methods of making piston rings which comprises folding a strip transversely of itself to form spaced-apart crowns and connecting web portions, bending the reversely folded strip into an annular body in which the lines of folding occur radially in spaced-apart relation at upper and lower sides of the ring body, removing portions of the strip between the crowns at the outer peripheral edges of the annular body to provide relieved crown portions, separating the relieved crown portions from respective adjacent crowns along lines of separation which extend axially of the ring, and flattening the relieved and separated crown portions into substantially flat segments which extend circumferentially of the ring beyond respective adjacent crown portions in planes at right angles to the axis of the ring.

2. That improvement in methods of making piston rings which comprises folding a strip of resilient piston ring material transversely of itself to form spaced-apart crowns and connecting web portions, bending the reversely folded strip into an annular body in which the lines of folding occur radially in spaced-apart relation, removing portions of the strip between the crowns at the outer peripheral edges of the annular body to provide upper and lower relieved crown portions which are of an arcuate length less than the space between the lines of folding at the outer periphery of the ring, separating the relieved crown portions from adjacent crown portions along lines of separation which extend axially of the ring, and flattening the separated and relieved crown portions into substantially flat segments arranged in spaced-apart parallel planes occurring at right angles to the axis of the ring.

3. That improvement in methods of making piston rings which comprises reversely folding a strip of resilient piston ring material transversely of itself to form spaced-apart bends and connecting web portions, bending the reversely folded strip into an annular body in which the lines of folding occur radially in spaced-apart relation, removing portions of the strip between the bends at the outer peripheral edges of the annular body to provide relieved bent portions whose outer peripheral edges are of a length less than the circumferential spacing between the said lines of folding of the bends at the outer periphery of the ring, partially separating the relieved bent portions from respective adjacent bent portions along lines of separation which extend axially of the ring, and flattening the relieved bent portions into substantially flat segments which extend circumferentially of the ring beyond the webs in spaced-apart parallel planes occurring at right angles to the axis of the ring.

THOMAS A. BOWERS.